(12) United States Patent
Van Stralen

(10) Patent No.: US 6,721,366 B1
(45) Date of Patent: Apr. 13, 2004

(54) PHASE TRACKING APPARATUS AND METHOD FOR CONTINUOUS PHASE MODULATED SIGNALS

(75) Inventor: Nick Andrew Van Stralen, Clifton Park, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/552,029

(22) Filed: Apr. 19, 2000

(51) Int. Cl.[7] .................................................. H04L 5/12
(52) U.S. Cl. ........................ 375/262; 375/265; 375/326; 375/341; 714/792; 714/794; 714/795; 714/796
(58) Field of Search ................................. 375/262, 265, 375/326, 340, 341, 371; 714/792, 794–796

(56) References Cited

U.S. PATENT DOCUMENTS

| | | | |
|---|---|---|---|
| 4,578,800 A | 3/1986 | Yasuda et al. | 375/354 |
| 5,325,402 A | 6/1994 | Ushirokawa | 375/341 |
| 6,493,409 B1 | 12/2002 | Lin et al. | 375/375 |
| 6,587,521 B1 | 7/2003 | Matui | 375/341 |

*Primary Examiner*—Stephen Chin
*Assistant Examiner*—Dac V. Ha
(74) *Attorney, Agent, or Firm*—Duane Morris LLP

(57) ABSTRACT

A method establishes a phase reference signal for trellis demodulating CPM modulated received signals by using phase reference signals and symbol timing estimates. Branch metrics signals representing the highest-probability path through the trellis are calculated to produce beat estimates of the modulation data. The branch metrics signals are phase shifted to produce phase shifted branch metrics (PSBM) for each path. At each symbol interval, the highest probability PSEM (HPPSBM) signal for the path is selected. The selected phase shifted branch metric adjusts the value of the phase reference signals. Another method estimates the transmitted signal from at least the estimated data and the phase reference signal. The estimated transmitted signal is phase shifted to produce phase shifted estimated transmitted signals, which are correlated with the received data signals to produce phase error signals, which are smoothed and correct the phase reference signal.

8 Claims, 5 Drawing Sheets

MAXIMUM LIKELIHOOD PHASE ESTIMATOR $$L(t,\theta,\tau,D) = C\exp\left\{-\frac{1}{N_o}\int_{T_o}(y(t)-s(t,\theta,\tau,D))^2 dt\right\} \quad (1)$$

$$l(t,\theta,\tau,\overline{d}) = \ln(C) - \frac{1}{N_o}\int_{T_o}(s(t,\theta,\tau,D))^2 + (y(t))^2 - 2y(t)s(t,\theta,\tau,D)dt \quad (2)$$

$$l(t,\theta,\tau,D) = \frac{1}{N_o}\int_{T_o} 2y(t)s(t,\theta,\tau,D)dt \quad (3)$$

$$0 = \frac{2}{N_o}\int_{T_o} y(t)\frac{\partial s(t,\theta,\tau,D)}{\partial \theta}dt \quad (4)$$

$$s(t,\theta,\tau,D) = \mathrm{Re}\left[\left(\frac{2E}{T}\right)^{1/2}\exp\left(j\left(\omega_o(t+\tau)+\theta+\pi\left(\sum_{i=-\infty}^{n-L}d_i h\right)+2\pi\sum_{i=n-L+1}^{n}d_i hq(t-iT+\tau)\right)\right)\right] \quad (5)$$

$$\frac{\partial s(t,\theta,\tau,D)}{\partial \theta} = \mathrm{Re}\left[j\left(\frac{2E}{T}\right)^{1/2}\exp\left(j\left(\omega_o(t+\tau)+\theta+\pi\left(\sum_{i=-\infty}^{n-L}d_i h\right)+2\pi\sum_{i=n-L+1}^{n}d_i hq(t-iT+\tau)\right)\right)\right] \quad (6)$$

$$0 = \int_{T_o} y(t)\mathrm{Re}\left[j\exp\left(j\left(\omega_o(t+\tau)+\theta+\pi\left(\sum_{i=-\infty}^{n-L}d_i h\right)+2\pi\sum_{i=n-L+1}^{n}d_i hq(t-iT+\tau)\right)\right)\right]dt \quad (7)$$

$$\mathrm{Re}\left[j\exp\left(j\left(\omega_o(t+\hat{\tau})+\theta+\pi\left(\sum_{i=-\infty}^{n-L}\hat{d}_i h\right)+2\pi\sum_{i=n-L+1}^{n}\hat{d}_i hq(t-iT+\hat{\tau})\right)\right)\right] \quad (8)$$

$$\lambda(A,m) = \int_{t=mT}^{mT+1} y(t)\mathrm{Re}\left[\exp\left(j\left(\omega_o(t+\tau)+\theta+\pi\left(\sum_{i=-\infty}^{m-L}d_i h\right)+2\pi\sum_{i=m-L+1}^{m}d_i hq(t-iT+\tau)\right)\right)\right]dt \quad (9)$$

$$\Theta_{m-L} = \pi\left(\sum_{i=-\infty}^{m-L}d_i h\right) \quad (10)$$

$$\lambda_I(A,m) = \int_{t=mT}^{mT+1} y(t)\mathrm{Re}\left[\exp\left(j\left(\omega_o(t+\tau)+\theta+2\pi\sum_{i=m-L+1}^{m}d_i hq(t-iT+\tau)\right)\right)\right]dt \quad (11)$$

$$\lambda_Q(A,m) = \int_{t=nT}^{nT+1} y(t)\mathrm{Re}\left[j\exp\left(j\left(\omega_o(t+\tau)+\theta+2\pi\sum_{i=m-L+1}^{m}d_i hq(t-iT+\tau)\right)\right)\right]dt \quad (12)$$

$$Q(A,m) = \int_{t=mT}^{mT+1} y(t)\mathrm{Re}\left[j\exp\left(j\left(\omega_o(t+\tau)+\theta+\pi\left(\sum_{i=-\infty}^{m-L}d_i h\right)+2\pi\sum_{i=m-L+1}^{m}d_i hq(t-iT+\tau)\right)\right)\right]dt \quad (13)$$

FIGURE 1a $$A_m = (d_{m-L+1}, d_{m-L+2}, \ldots, d_m) \qquad (14)$$

$$Q(A,m) = Im\,[\exp(j\Theta_{m-1})\,[\lambda_I(A,m) + j\lambda_Q(A,m)]] \qquad (15)$$

$$\lambda(A,m) = Re\,[\exp(j\Phi_{m-1})\,[\lambda_I(A,m) + j\lambda_Q(A,m)]] \qquad (16)$$

FIGURE 1b

PHASE TRACKING APPARATUS AND METHOD FOR CONTINUOUS PHASE MODULATED SIGNALS

FIELD OF THE INVENTION

This invention relates to improvement or resynchronization of phase reference signals in signal demodulation or decoding arrangements.

BACKGROUND OF THE INVENTION

Trellis decoders or demodulators are used to demodulate signals modulated by continuous phase modulation (CPM). In the context of the present invention, coding/decoding and modulation/demodulation are analogous, and may be viewed as corresponding. The CPM modulation scheme has the advantage of providing a signal having substantially constant power, which is a marked advantage when transmitting the modulated signals over a nonlinear channel, as constant power tends to reduce the generation in such a channel of unwanted distortion products which obscure the signals. A further advantage of CPM modulation is that the bandwidth of the signal is easily maintained, and the frequency spectrum exhibits low sidelobes, which is advantageous for situations in which a plurality of signals traverses a channel, as the signal spectrum for one of the signals traversing the channel has little frequency overlap with the signal next adjacent in frequency.

CPM modulation is performed, in general, by converting the information or signal to m–ary quantized form, if not already in the desired form. For the simple case in which m=1, the signal is converted into binary form. The m–ary signal is applied to a shift register array having a particular length. As the signal bits are applied to the input end of the shift register array, the previously-applied signals propagate through the register array, altering the states of the registers in succession. A combinatorial or functional logic arrangement is coupled to the output of each register of the array, and applies some function to the combination of register logic states, which function results in one or more output signals, which depend upon the combinatorial function, and also depend upon the current state of each register of the array, which in turn depends upon the history of the input signal.

The demodulation of a signal modulated in the above-described fashion may be accomplished by a trellis demodulator. The "trellis" represents, by "nodes", the possible states of the registers of the modulator, and by lines joining the nodes the possible paths by which transitions between states can be made. The trellis demodulator is often implemented as a Viterbi algorithm which performs sequence detection on the received symbol sequence. Demodulation using a Viterbi algorithm requires an accurate estimate of the phase of the carrier signal with respect to the transmitter reference phase. The process of obtaining an accurate estimate is known as carrier phase synchronization.

The appropriate likelihood function $L(t, \theta, \tau, D)$ for estimating the carrier phase is defined by equation (1) of FIG. 1, where $N_0$ is the noise power, $T_0$ is the observation interval, y(t) is the received signal, C is a constant responsive to the amplitude of the received signal, and $s(t, \theta, \tau, D)$ is the transmitted signal. The parameters of the transmitted signals are $\theta$, the carrier phase; $\tau$, the symbol timing reference, and D, the transmitted data sequence. Taking logarithms and expanding the squared term in equation (1) gives the log-likelihood function $l(t, \theta, \tau, D)$ as set forth in equation (2) of FIG. 1.

The constant first term of equation (2) of FIG. 1 and the second term within the integral of equation (2) of FIG. 1 are independent of the parameter $\theta$ of interest and can be dropped. For a constant envelope scheme such as CPM, the first term within the integral of equation (2) is also independent of the carrier phase reference $\theta$. The equivalent log-likelihood function $l(t, \theta, \tau, D)$ to be maximized is therefore given by equation (3) of FIG. 1.

A necessary condition for a maximum of the equivalent log-likelihood function of equation (3) of FIG. 1 is that the derivative be zero at the maximum. Differentiating equation (3) with respect to the carrier phase reference $\theta$, and setting the result equal to zero, gives likelihood equation (4) of FIG. 1.

The transmitted signal in a CPM arrangement can be expressed as $s(t, \theta, \tau, D)$ in equation (5), where D is a vector, E is the transmit energy, T is the symbol period, $\omega_0$ is the carrier frequency, and $D=(d_{-\infty}, \ldots d_{n-2}, d_{n-1}, d_n)$ is the transmit information or data sequence. In equation (5), three parameters q(•), L, and h determine (establish) the specific CPM modulation scheme being used, wherein q(•) is the phase pulse, L is the duration of the phase pulse, and h is the modulation index. Substituting the definition of the transmitted signal of equation (5) into the partial derivative of equation (4) one obtains equation (6) of FIG. 1. Ignoring the constants, the likelihood equation associated with equation (6) is equation (7) of FIG. 1.

Improved phase tracking method and apparatus are desired.

SUMMARY OF THE INVENTION

A method, according to an aspect of the invention, for establishing a phase reference signal for demodulating signals which are CPM modulated onto a carrier, includes the step of trellis demodulating received modulated signals using phase reference signal and symbol timing estimates, by calculating branch metrics signals representative of the likelihood that the branch was in the modulator path. The branch metrics signals are used to select the path through the trellis having the highest probability, representing a best estimate of the modulation signals. The branch metrics signals are phase shifted by $\pi/2$, to thereby generate phase shifted branch metrics signals associated with each path. At each symbol interval, the phase shifted branch metric associated with that one of the paths having the highest probability is selected. The selected phase shifted branch metric is used to adjust the value of the phase reference signals.

An apparatus according to an aspect of the invention, for demodulating data signals CPM modulated onto a carrier, includes a source of phase reference signals and a source of symbol timing estimates. A trellis demodulator is coupled to the source of phase reference signals and to the source of symbol timing estimates, for demodulating received modulated signals using the phase reference signals together with the symbol timing estimates, by calculating branch metrics signals representative of the likelihood that the branch was in the modulator path. A phase shifter phase shifts the branch metrics signals by $\pi/2$, to thereby generate phase shifted branch metrics signals associated with each path. A decoder using the branch metrics signals selects the path through the trellis having the highest probability. This path represents a best estimate of the data signals. The decoder also, at each symbol interval, for that one of the paths having the highest probability, selects or outputs the associated phase shifted branch metric. An adjustment arrangement is coupled to the source of phase reference signals and to the decoder, for applying the selected phase shifted branch metric to adjust the value of the phase reference signals. In a particular version of this aspect of the invention, the adjustment means comprises selected phase shifted branch metric signal smoothing means, which may include a low-pass filter.

According to another aspect of the invention, a method for establishing a phase reference signal for demodulating received data signals CPM modulated onto a carrier includes the step of trellis demodulating received modulated signals using a phase reference signal and symbol timing estimates. The step of trellis demodulating includes the calculation of branch metrics signals representative of the likelihood that the branch was in the modulator path, to ultimately produce estimated data signals. The method according to this other aspect of the invention further includes the estimation of least a form of the transmitted signal from the estimated data, the phase reference signal and the symbol timing estimates. The "form of the transmitted signal," in this context, means a signal similar to the transmitted signal, but which may be at a downconverted frequency, or at baseband, rather than at a carrier frequency. The method includes the step of phase shifting the form of the transmitted signal, to thereby produce phase-shifted estimated transmitted signals. The phase-shifted estimated transmitted signals are correlated with at least a form of the received data signals, to produce phase error signals, and the phase error signals are applied or used to correct the phase reference signal. In this particular aspect of the invention, the phase error signals are smoothed before the step of applying. In another mode of this particular aspect of the invention, the phase shift is in the amount of $\pi/2$.

An apparatus, according to another avatar of the invention, for demodulating received data signals CPM modulated onto a carrier, includes a controllable source of phase reference signals and a source of symbol timing estimates. A trellis demodulator is coupled to the source of phase reference signals and to the source of symbol timing estimates, for demodulating at least signals having the same form, (but not necessarily the same frequency (ies)) as the received data signals modulated onto a carrier, using the phase reference signals together with the symbol timing estimates. The trellis demodulator does this by calculating branch metrics signals representative of the likelihood that the branch was in the modulator path, to thereby generate estimated data signals. A transmitter signal reconstituting arrangement is coupled to the trellis demodulator for receiving the estimated data signals, to the source of phase reference signals, and to the source of symbol timing estimates, for generating an estimate of the transmitted signals. A phase shifter is coupled to the transmitter signal reconstituting arrangement, for phase shifting the estimate of the transmitted signals by $\pi/2$, to thereby generate phase shifted estimated transmitted signals. A correlator is coupled to the phase shifter for receiving the phase shifted estimated transmitted signals, and the correlator is also coupled to receive the signals having the same form as the received data signals modulated onto a carrier, for correlating the phase shifted estimated transmitted signals with the signals having the same form as the received data signals modulated onto a carrier, to thereby produce a phase error signal. An adjustment arrangement is coupled to the correlator and to the source of phase reference signals, for applying the phase error signals to the source of phase reference signals, for adjusting the value of the phase reference signals.

BRIEF DESCRIPTION OF THE DRAWING

FIGS. 1a and 1b set forth equations (1) through (16) associated with the background of the invention and with the invention;

DESCRIPTION OF THE INVENTION

The data sequence D and the timing reference $\tau$ are not known to the receiver. If the receiver is operated in a tracking mode, so that the timing tracking errors are small, and if the signal-to-noise ratio (SNR) is high enough so that the detected data sequence is usually correct, then the receiver estimates can be substituted for D and $\tau$ in equation (7) of FIGS. 1a and 1b. The invention is based upon the understanding that, with these assumptions, the right side of equation (7) can be used as an error signal to correct the current estimate of the carrier phase reference. The term of expression (8) of FIGS. 1a and 1b, which is the term within the integral in equation (7), is simply the receiver's estimate of the transmitted signal phase, phase shifted by 90° or $\pi/2$.

Figure 2:
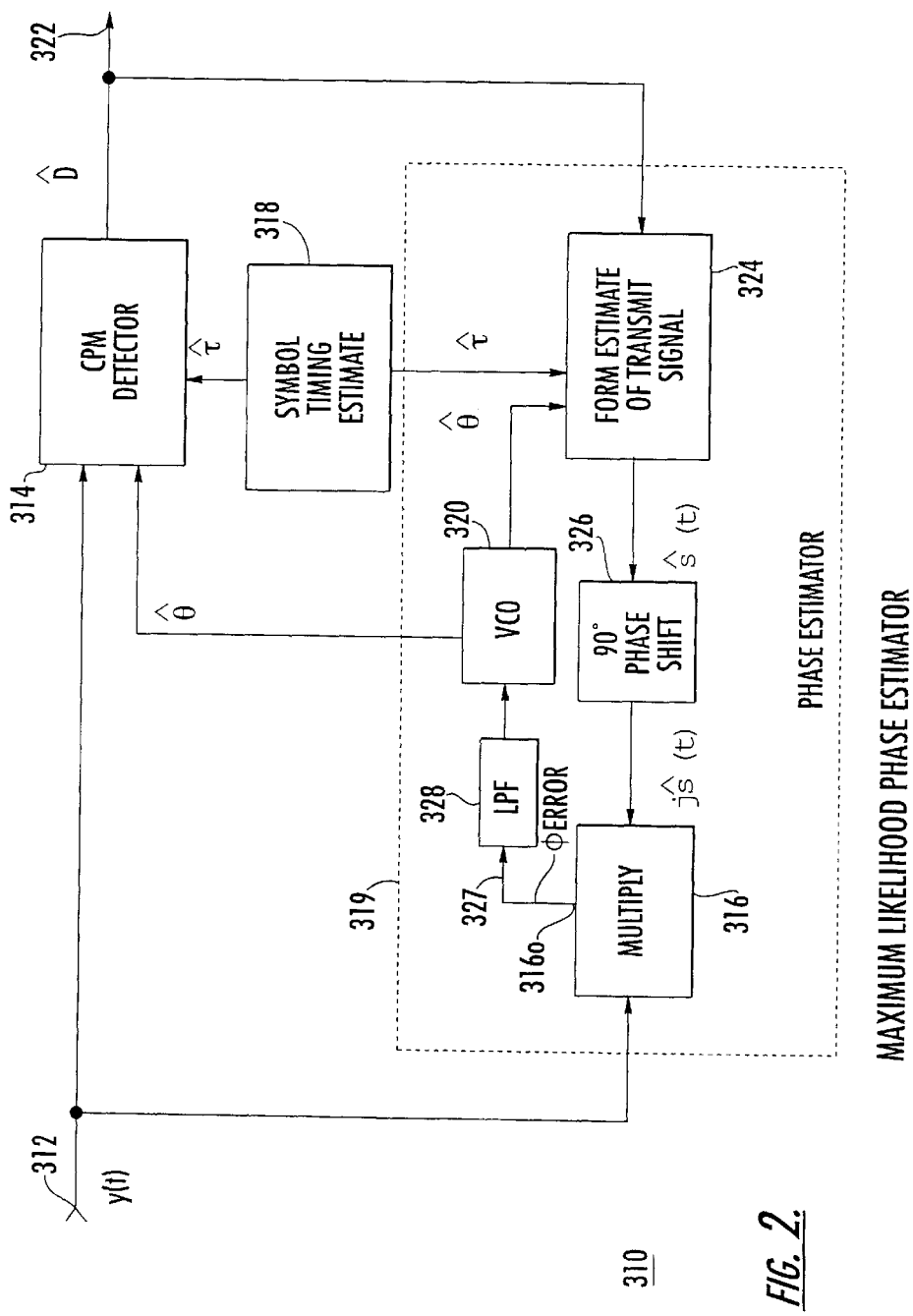
FIG. 2 is a simplified block diagram of a maximum likelihood phase tracking synchronizer demodulator according to an aspect of the invention.

FIG. 2 is a simplified block diagram of a maximum likelihood phase tracking synchronizer 310 based upon this understanding. In FIG. 2, the modulated received signal y(t), which is equal to the transmitted signal s(t) plus channel noise, is applied by way of an input port 312 to a conventional CPM detector 314 and to a multiplier or correlator 316. The applied signals may be the data signals modulated onto the carrier, or a downconverted version thereof, or even a baseband version thereof, which are equivalent or related signals of the same form. Detector 314 receives a symbol timing estimate $\hat{\tau}$ from a symbol timing estimator 318 and a transmitter phase reference signal $\hat{\theta}$ from a controlled oscillator (VCO) 320 of a maximum likelihood phase estimator 319, and produces an estimate $\hat{D}$ of the transmitted signal, which estimate is applied to an output port 322 and to a signal regenerator or estimator 324. Signal regenerator 324 also receives estimates of $\hat{\theta}$ and $\hat{\tau}$, and produces or forms an estimate $\hat{s}(t)$ of the transmitted signal.

In the arrangement of FIG. 2, estimate $\hat{s}(t)$ is applied by way of a 90° phase shifter 326 to correlator 316. Correlator 316 correlates the received signal y(t) with the phase-shifted estimate $j\hat{s}(t)$, and produces a correlation signal at its output port 316o. This correlation signal may be viewed as being a phase error signal $\phi_{error}$. The time-variant correlation or phase error signal at the output of correlator 316 is applied to VCO 320 by way of a signal path 327 and a low-pass or smoothing filter (LPF) 328 to adjust the phase of the transmitter phase reference $\hat{\theta}$. In operation of the arrangement of FIG. 2, the CPM detector block 314 receives signal y(t) and estimates of the transmitter phase reference $\hat{\theta}$ and the transmitter timing reference $\hat{\tau}$, and uses these inputs, together with the Viterbi algorithm, as generally described in *Digital Communications and Spread Spectrum Signals*, Rodger E. Ziermer and Roger L. Peterson, Macmillan Publishing, New York, 1985, Appendix D, pp 704–712, to form an estimate of the transmitted data sequence, see also *Digital Phase Modulation*, John B. Anderson, Tor Aulin, and Carl-Erik Sundberg, Plenum Press, New York, pp252–255. The estimate of the transmitted data sequence can also be termed the "demodulated data" and is denoted by $\hat{D}$. The demodulated data sequence is applied to the phase estimator 319 of FIG. 2, where it is used to reconstruct the $\pi/2$ phase shifted replica of the hypothesized transmitted signal. This phase-shifted hypothesized replica is correlated against the signal actually received. The output of the correlation is applied as an error signal to update the phase reference signal.

Figure 3:
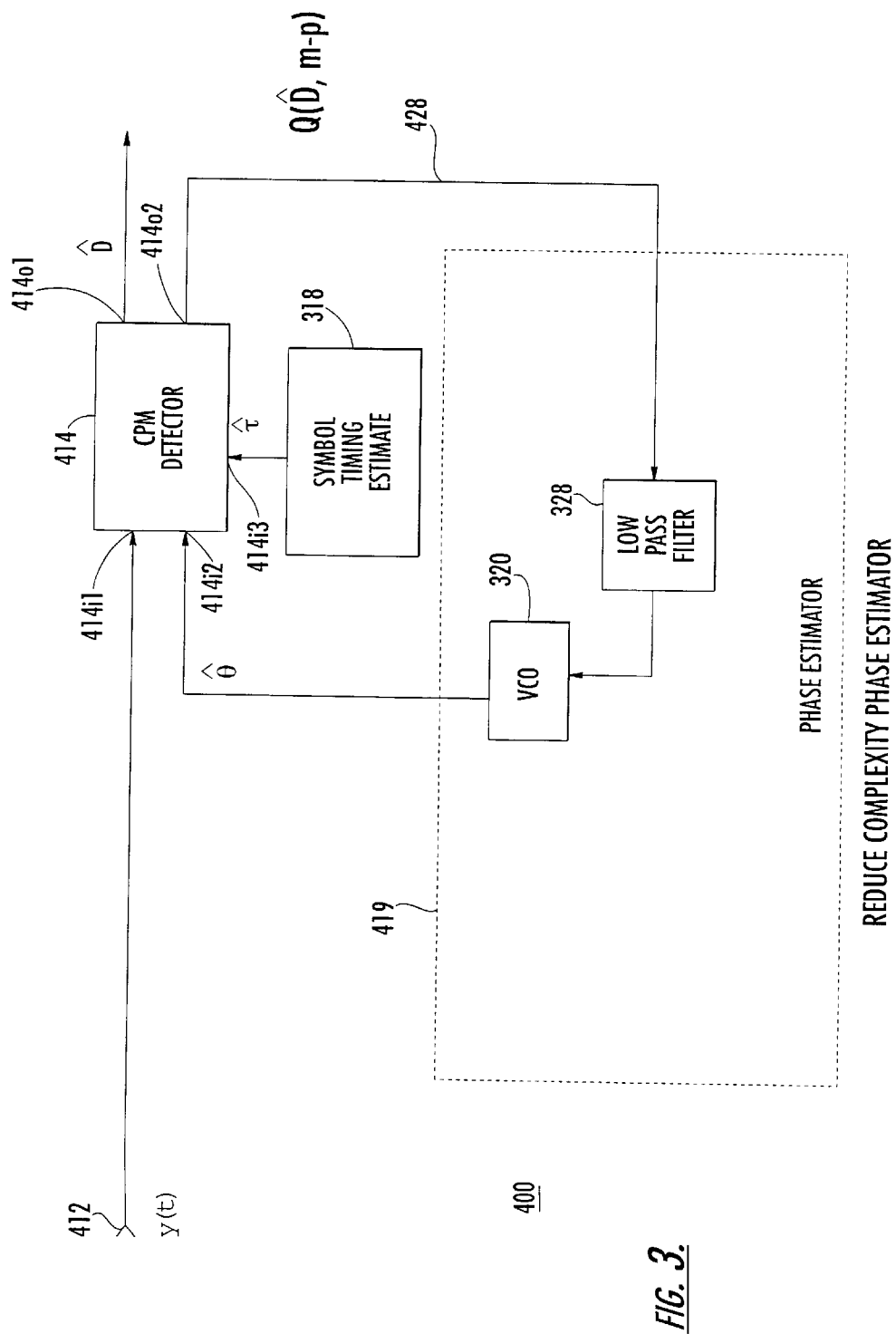
FIG. 3 is a simplified block diagram of another embodiment of the invention, in which circuit simplifications reduce the complexity of the phase tracking relative to the arrangement of FIG. 2.

According to another aspect of the invention, it is recognized that, if the CPM detector includes a Viterbi decoder for tracking the state probable phase path, application of the quadrature components of the branch metrics to the Viterbi decoder results in the Viterbi decoder additionally maintaining a record of the estimated phase for the chosen path. In essence, the Viterbi decoder, when provided with such information, produces signals which are equivalent to those produced by estimated transmitted signal generator 324, phase shifter 326, and correlator 316 of FIG. 2. FIG. 3 is a simplified block diagram of a simplified or reduced complexity phase estimator and demodulator 400 according to this aspect of the invention. In FIG. 3, the received signal y(t) is applied by way of a port 412 to an input port 414i1 of a CPM detector 414, which, with the aid of the $\hat{\tau}$ from a symbol timing estimator designated 318 applied to its input port 414i3 and $\hat{\theta}$ signals applied from a transmitter phase reference source 419 to input port 414i2, produces the estimate $\hat{D}$ of the data sequence at its first output port 414o1. According to this aspect of the invention, the detector 414 also produces, at its second output port 414o2, the signal $Q(\hat{D}, m-p)$, which is the quadrature component of the branch metric, associated with the decoder's current most likely path at trellis index m, p trellis levels deep. The branch metric associated with the decoder's most likely path is the branch metric of the branch that was chosen in the Viterbi algorithms compare/select operation. The term "p trellis levels deep" specifies that the quadrature component of interest corresponds to the branch in the most likely path p trellis levels deep. This means that these Q(D,m–p) values must be stored within the Viterbi algorithm for each stored path in the Viterbi algorithm for at least p trellis levels.

Figure 4:
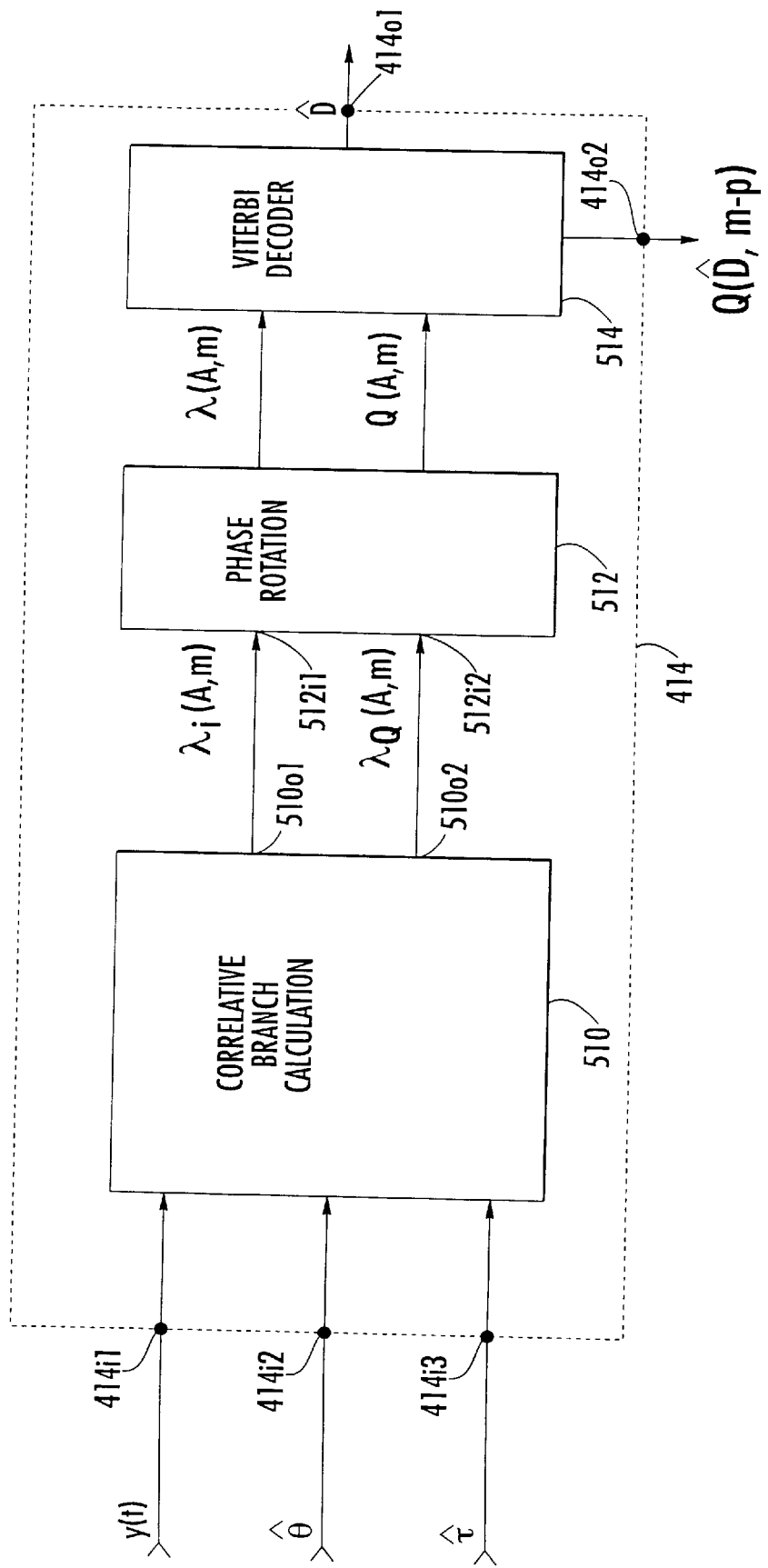
FIG. 4 is a simplified block diagram illustrating details of the demodulator of FIG. 3, including a Viterbi decoder.

The quadrature component $Q(\hat{D}, m-p)$ produced by CPM detector 414 of FIG. 4 is applied by way of a signal path 428 to a low-pass filter designated 328, which smoothes the signals, and the smoothed signals are applied to a VCO designated 320. The use of the same designation as those given to elements of the arrangement of FIG. 3 is intended to indicate that the functions or structures are equivalent (although the specific parameters may differ). The output $\hat{\theta}$ of VCO 320 is also the output of the transmitter phase estimator 419.

FIG. 4 is a simplified block diagram illustrating details of a detector 414 according to another hypothesis of the invention. In FIG. 4, the received signal y(t) is applied by way of input port 414i1 to a correlative branch calculation block 510, and the estimated transmitter phase reference $\hat{\theta}$ and the estimated symbol timing signals $\hat{\tau}$ are applied to block 510 by way of input ports 414i2 and 414i3, respectively. Block 510 calculates $\lambda_I(A,m)$ and $\lambda_q(A,m)$ according to equations (11) and (12) of FIGS. 1a and 1b, respectively, where A is the hypothesized data sequence, equation (14) of FIGS. 1a and 1b, and generates the resulting signals at its output ports 510o1 and 510o2, respectively. Note that in equation (10) the hypothesized data sequence is required to extend over only L intervals, where L is the duration of the phase pulse, so that only a finite number of hypothesized data sequences A exist. The $\lambda_I(A,m)$ and $\lambda_q(A,m)$ signals calculated by block 510 of FIG. 4 are applied to a phase rotation calculation block 512, which rotates the phase in accordance with equations 15 and 16 of FIGS. 1a and 1b (where $\Phi_{m-L}$ is given by equation (10)), to produce the $\lambda(A,m)$ and $Q(A,m)$ of equations (9) and (13), respectively, of FIGS. 1a and 1b. The $\lambda(A,m)$ and $Q(A,m)$ signals produced by rotation block 512 are applied to a Viterbi decoder illustrated as a block 514, which performs the usual determination of the most likely trellis state, and produces the estimated data sequence or signal $\hat{D}$ at output port 414o1. Viterbi decoder 514 also keeps track of the phase transitions occurring in the trellis which are associated with paths leading to each state. A set of these phase transitions, designated $Q(\hat{D}, m-p)$, are associated with each current state. When the Viterbi algorithm of block 514 selects the most likely or most probable state, it also outputs the associated set of phase transitions at an output port 414o2. As mentioned above, the phase transitions $Q(\hat{D}, m-p)$ are made available for filtering by filter 328 of the arrangement of FIG. 3, and for application to update VCO 320.

In FIG. 4, the input signals y(t), the estimates ($\hat{\theta}$) of the carrier phase reference, and the estimates ($\hat{\tau}$) of the symbol timing are applied to the correlative branch calculation circuit or block 510. Within block 510, the set of correlative state branch metrics signals $\lambda_I(A,m)$ of equation (11), and $\lambda_Q(A,m)$ of equation (12) are calculated according to equations (11) and (12) of FIGS. 1 and 2, where A is given in equation (14). These correlative state branch metrics are output from ports 510o1 and 510o2 of block 510, and are applied to input ports 512i1 and 512i2 of phase rotation block 512. The branch metrics $\lambda_{(A,m)}$ and the quadrature components Q(A,m) of the branch metrics are computed for all the branches in the trellis for the current trellis level index according to equations (15) and (16) of FIGS. 1a and 1b. These branch metrics and quadrature components of the branch metrics leave phase rotation block 512 by ports 512o1 and 512o2, respectively, and are applied to input ports of Viterbi decoder block 514. The Viterbi algorithm is performed in block 514 in accordance with the principles set forth in the abovementioned Anderson et al. text. In the branch history update section of the Viterbi decoder, the quadrature components of the branch metrics (the Q(A,m) components) are identified for each path selected and stored within the Viterbi algorithm for at least p trellis intervals. The estimated data sequenceD is produced by Viterbi decoder block 514 at output port 414o1 of CPM detector 414, and the quadrature component of the branch metric, associated with the decoder's current most likely path at trellis index m, p trellis levels deep, is produced at output port 414o2.

Other embodiments of the invention will be apparent to those skilled in the art. For example, while the described demodulator arrangement is intended to demodulate signals modulated by a CPM modulator, it may be used to decode signals encoded by a trellis encoder. It should be noted that the use of the singular term "signal" and plural term "signals" should not be interpreted to mean different things unless the context makes it mandatory, as few structures generate but a single signal during their lifetimes; one example might be a detonator signal of an explosive device, which during its life might in truth generate only one such signal.

Thus, a method (FIGS. 3,4) for establishing a phase reference signal ( ) for demodulating signals (y(t)) which are CPM modulated onto a carrier ($\omega_0$) includes the step of trellis demodulating received modulated signals (block 510) using phase reference signal ($\hat{\theta}$) and symbol timing ($\hat{\tau}$) estimates, by calculating branch metrics signals (equation 9) representative of the likelihood that the branch was in the modulator path. The branch metrics signals are used to select the path through the trellis having the highest probability, representing a best estimate (D̂) of the data signals (D). The branch metrics signals are phase shifted by π/2 (in block 512), to thereby generate phase shifted branch metrics signals (Q(A,m)) associated with each path. At each symbol interval (τ), the phase shifted branch metric (Q(A,m)) associated with that one of the paths having the highest probability is selected (block 514). The selected phase shifted branch metric (Q(A,m)) is used (428, 328, 320) to adjust the value of the phase reference signals (τ).

An apparatus (400) according to an aspect of the invention, for demodulating data signals (D) CPM modulated onto a carrier, includes a source (320) of phase reference signals and a source (318) of symbol timing estimates. A trellis demodulator (414, 510) is coupled to the source (320) of phase reference signals and to the source (318) of symbol timing estimates, for demodulating received modulated signals y(t) using the phase reference signals together with the symbol timing estimates, by calculating (equation 9) branch metrics signals representative of the likelihood that the branch was in the modulator path. A phase shifter (512) phase shifts the branch metrics signals by π/2, to thereby generate phase shifted branch metrics signals (Q(A,m)) associated with each path. A decoder (514) using the branch metrics signals selects the path through the trellis having the highest probability. This path represents a best estimate of the data signals (D). The decoder (514) also, at each symbol interval (τ), for that one of the paths having the highest probability, selects or outputs the associated phase shifted branch metric (Q(A,m)). An adjustment arrangement (427, 328) is coupled to the source (320) of phase reference signals and to the decoder (514), for applying the selected phase shifted branch metric (Q(A,m)) to adjust the value of the phase reference signals (θ̂). In a particular version of this aspect of the invention, the adjustment means comprises selected phase shifted branch metric signal smoothing means (328), which may include a low-pass filter.

According to another aspect of the invention, a method (FIG. 2) for establishing a phase reference signal for demodulating received data signals CPM modulated onto a carrier includes the step of trellis demodulating received modulated signals y(t) using a phase reference signal (θ̂) and symbol timing (τ) estimates. The step of trellis demodulating includes the calculation (Equation 9) of branch metrics signals representative of the likelihood that the branch was in the modulator path, to ultimately produce estimated data (D̂) signals. The method according to this other aspect of the invention further includes the estimation (block 324) of least a form (ŝ) of the transmitted signal from the estimated data (D̂), the phase reference signal (θ̂) and the symbol timing (τ) estimates. The "form of the transmitted signal," in this context, means a signal similar to the transmitted signal y(t), but which may be at a downconverted frequency, or at baseband, rather than at a carrier frequency. The method further includes the step of phase shifting the form of the transmitted signal y(t), to thereby produce phase-shifted estimated transmitted signals jŝ(t). The phase-shifted estimated transmitted signals jŝ(t) are correlated with at least a form of the received data signals y(t), to produce phase error signals ($\phi_{error}$), and the phase error signals ($\phi_{error}$) are applied or used to correct the phase reference signal (θ̂). In this particular aspect of the invention, the phase error signals (θ̂) are smoothed (LPF 328) before the step of applying. In another mode of this particular aspect of the invention, the phase shift is in the amount of π/2 or 90°.

An apparatus (310), according to another avatar of the invention, for demodulating received data (D) signals CPM modulated onto a carrier (y(t)), includes a controllable source (320) of phase reference signals (θ̂) and a source (318) of symbol timing estimates (τ). A trellis demodulator (314) is coupled to the source (320) of phase reference signals (θ̂) and to the source (318) of symbol timing estimates (τ), for demodulating at least signals having the same form (but not necessarily the same frequency (ies)) as the received data signals modulated onto a carrier (y(t)), using the phase reference signals (θ̂) together with the symbol timing estimates (τ) The trellis demodulator (314) does this by calculating branch metrics signals (equation 9) representative of the likelihood that the branch was in the modulator path, to thereby generate estimated data signals D̂. A transmitter signal reconstituting arrangement (324) is coupled to the trellis demodulator (314) for receiving the estimated data signals (D̂), to the source (320) of phase reference signals, and to the source (318) of symbol timing estimates, for generating an estimate (ŝ(t)) of the transmitted signals (s(t)). A phase shifter (326) is coupled to the transmitter signal reconstituting arrangement (324), for phase shifting the estimate of the transmitted signals (ŝ(t)) by π/2, to thereby generate phase shifted estimated transmitted signals (jŝ(t)). A correlator (316) is coupled to the phase shifter (326) for receiving the phase shifted estimated transmitted signals, and the correlator (316) is also coupled to receive the signals (y(t)) having the same form as the received data signals modulated onto a carrier, for correlating the phase shifted estimated transmitted signals (jŝ(t)) with the signals having the same form as the received data signals (y(t)) modulated onto a carrier, to thereby produce a phase error signal ($\phi_{error}$). An adjustment arrangement (327, 328) is coupled to the correlator (326) and to the source (320) of phase reference signals (θ̂), for applying the phase error signals ($\phi_{error}$) to the source (320) of phase reference signals, for adjusting the value of the phase reference signals (θ̂).

What is claimed is:

1. A method for establishing a phase reference signal for demodulating data signals CPM modulated onto a carrier, said method comprising the steps of:

trellis demodulating received modulated signals using phase reference signal and symbol timing estimates, by calculating branch metrics signals representative of the likelihood that the branch was in the modulator path;

using said branch metrics signals to select the path through said trellis having the highest probability, representing a best estimate of said data signals;

phase shifting said branch metrics signals by π/2, to thereby generate phase shifted branch metrics signals associated with each path;

at each symbol interval, for that one of said paths having the highest probability, selecting the associated phase shifted branch metric; and using said selected phase shifted branch metric to adjust the value of said phase reference signals.

2. An apparatus for demodulating data signals CPM modulated onto a carrier, said apparatus comprising:

a source of phase reference signals;

a source of symbol timing estimates;

a trellis demodulator coupled to said source of phase reference signals and to said source of symbol timing estimates, for demodulating received modulated signals using said phase reference signals together with said symbol timing estimates, by calculating branch metrics signals representative of the likelihood that the branch was in the modulator path;

a phase shifter for phase shifting said branch metrics signals by π/2, to thereby generate phase shifted branch metrics signals associated with each path;

a decoder using said branch metrics signals to select the path through said trellis having the highest probability, representing a best estimate of said data signals and for, at each symbol interval, for that one of said paths having the highest probability, selecting the associated phase shifted branch metric; and adjustment means coupled to said source of phase reference signals and to said decoder, for applying said selected phase shifted branch metric to adjust the value of said phase reference signals.

3. An apparatus according to claim 2, wherein said adjustment means comprises selected phase shifted branch metric signal smoothing means.

4. An apparatus according to claim 2, wherein said source of phase reference signals comprises a voltage-controlled oscillator.

5. A method for establishing a phase reference signal for demodulating received data signals CPM modulated onto a carrier, said method comprising the steps of:

trellis demodulating received modulated signals using phase reference signal and symbol timing estimates, by calculating branch metrics signals representative of the likelihood that the branch was in the modulator path, to produce estimated data;

estimating at least a form of the transmitted signal from said estimated data, said phase reference signal and said symbol timing estimates;

phase shifting said form of said transmitted signal to thereby produce phase-shifted estimated transmitted signals;

correlating said phase-shifted estimated transmitted signals with at least a form of the received data signals, to produce phase error signals; and applying said phase error signals to correct said phase reference signal.

6. A method according to claim 5, wherein said phase error signals are smoothed before said step of applying.

7. A method according to claim 5, wherein said phase shift is in the amount of $\pi/2$.

8. An apparatus for demodulating received data signals CPM modulated onto a carrier, said apparatus comprising:

a controllable source of phase reference signals;

a source of symbol timing estimates;

a trellis demodulator coupled to said source of phase reference signals and to said source of symbol timing estimates, for demodulating at least signals having the same form as said received data signals modulated onto a carrier, using said phase reference signals together with said symbol timing estimates, by calculating branch metrics signals representative of the likelihood that the branch was in the modulator path, to thereby generate estimated data signals a transmitter signal reconstituting arrangement coupled to said trellis demodulator for receiving said estimated data signals, to said source of phase reference signals, and to said source of symbol timing estimates, for generating an estimate of the transmitted signals;

a phase shifter coupled to said transmitter signal reconstituting arrangement, for phase shifting said estimate of said transmitted signals by $\pi/2$, to thereby generate phase shifted estimated transmitted signals;

a correlator coupled to said phase shifter for receiving said phase shifted estimated transmitted signals, and also coupled to receive said signals having the same form as said received data signals modulated onto a carrier, for correlating said phase shifted estimated transmitted signals with said signals having the same form as said received data signals modulated onto a carrier to produce a phase error signal; and adjustment means coupled to said correlator and to said source of phase reference signals, for applying said phase error signal to said source of phase reference signals, for adjusting the value of said phase reference signals.

* * * * *